| (12) | United States Patent | (10) Patent No.: | US 8,297,681 B2 |
|---|---|---|---|
| | Sato et al. | (45) Date of Patent: | Oct. 30, 2012 |

(54) GLASS RUN

(75) Inventors: Nobumasa Sato, Fukuyama (JP); Kotaro Kishi, Hiroshima (JP); Hiroaki Miyahara, Hiroshima (JP)

(73) Assignee: Nishikawa Rubber Co., Ltd., Hiroshima-shi (JP)

( * ) Notice: Subject to any disclaimer, the term of this patent is extended or adjusted under 35 U.S.C. 154(b) by 442 days.

(21) Appl. No.: 12/608,265

(22) Filed: Oct. 29, 2009

(65) Prior Publication Data

US 2010/0117401 A1    May 13, 2010

(30) Foreign Application Priority Data

Nov. 10, 2008 (JP) ................................. 2008-287790
Sep. 25, 2009 (JP) ................................. 2009-220419

(51) Int. Cl.
   *B60J 10/04*   (2006.01)
(52) U.S. Cl. ..................... 296/146.2; 49/441; 49/489.1
(58) Field of Classification Search ............... 296/190.1, 296/146.2, 146.13, 146.9, 146.16, 93; 49/441, 49/489.1, 490.1
   See application file for complete search history.

(56) References Cited

U.S. PATENT DOCUMENTS

| 4,648,207 | A * | 3/1987 | Shibasaki | 49/441 |
| 8,001,728 | B2 * | 8/2011 | Shibata et al. | 49/489.1 |
| 2006/0218865 | A1 * | 10/2006 | Tamaoki | 49/415 |
| 2006/0248802 | A1 * | 11/2006 | Tamaoki et al. | 49/441 |
| 2008/0012388 | A1 * | 1/2008 | Kinoshita et al. | 296/201 |
| 2009/0039672 | A1 * | 2/2009 | Kubo et al. | 296/146.2 |

FOREIGN PATENT DOCUMENTS

| JP | 4-84026 U | | 7/1992 |
| JP | 04-84026 U | | 7/1992 |
| JP | 405330345 A | * | 12/1993 |
| JP | 2006-281833 A | | 10/2006 |
| JP | 2008-155697 A | | 7/2008 |
| JP | 2011-1212140 A | * | 3/2012 |

* cited by examiner

*Primary Examiner* — Jason S Morrow
(74) *Attorney, Agent, or Firm* — Holtz, Holtz, Goodman & Chick, PC

(57) ABSTRACT

A glass run 5 fit on a door sash 2 of an automobile has: a cross-section roughly U-shape comprising an outer-cabin side wall 6, an inner-cabin side wall 7 and a connecting wall 18 which connects the outer-cabin side wall 6 and the inner-cabin side wall 7 for guiding a door glass 3 lifting or lowering into a ditch part 4; and an outer lip 9 and an inner lip 10 respectively formed on inner surfaces of both of the side walls 6, 7, which extend toward a connecting wall 18 side and are slidably brought into contact with the door glass 3, wherein: the connecting wall 18 has a part thereof swelled and curved toward an inner surface side thereof, which faces a position on the connecting wall 18 where the door glass 3 collides; the connecting wall 18 swelled and curved has two projections 21, 22 formed on an outer surface thereof, which come into contact with the door sash 2 and of which an interval 50 therebetween is not more than thickness 60 of the door glass 3; and a position surrounded by the two projections 21, 22, the connecting wall 18 and the door sash 2 is formed into a space 40 having a cross-section roughly semicylindrical shape.

8 Claims, 6 Drawing Sheets

GLASS RUN

BACKGROUND OF THE INVENTION

The present invention relates to a glass run which is fit on a door sash or a door frame of an automobile and guides a door glass lifting or lowering.

As shown in FIGS. 6 and 7, an ordinary glass run 5 for guiding a door glass 3 lifting or lowering into a ditch part 4 has been fit on a door sash 2 of an automobile door 1. FIG. 7 is a I-I line enlarged cross section of FIG. 6.

The glass run 5 has a cross-section roughly U-shape having the ditch part 4 formed therein, which comprises two side walls, an outer-cabin side wall 6 and an inner-cabin side wall 7, and a connecting wall 8 which connects the outer-cabin side wall 6 and the inner-cabin side wall 7. The outer-cabin side wall 6 has an outer lip 9 formed on an inner-cabin side as an inner surface thereof, which extends toward a connecting wall 8 side. In the same way, the inner-cabin side wall 7 has an inner lip 10 formed on an outer-cabin side as an inner surface thereof, which extends toward the connecting wall 8 side. The outer lip 9 and the inner lip 10 are installed in such a manner as to fasten the door glass 3 and are slidably brought into contact with a surface of the door glass 3.

The connecting wall 8 has a lip 15 formed on an inner surface on the inner-cabin side thereof, which slants toward the outer-cabin side wall 6.

According to the above-structured glass run 5, when the door glass 3 lifts as shown in FIG. 8, an end 3a of the door glass 3 presses the lip 15 against the inner surface of the connecting wall 8 so that an outer surface of the connecting wall 8 collides with the door sash 2 and comes to a stop for the effect of stress from the pressure.

Jarring bash sound as impact sound generated in such a circumstance has given rise to demands on reduction of bumping sound at the time of fully closing the door glass 3.

In this connection, there has been proposed a glass run 5 shown in FIG. 9 where two projections 11 and 12, formed on an outer-surface side of the connecting wall 8 of the glass run 5 have soft sponge 20 or a cushion provided therebetween or sealant filled therebetween in order to reduce the bumping sound at the time of fully closing the door glass 3. Such a structure is disclosed, for example, in the Japanese unexamined Patent Publications No. 2008-155697 and 2006-281833.

In addition, there has been proposed a glass run 5 shown in FIG. 10 where an elastically deformed part comprising a plurality of convexes 13 and a plurality of concaves 14 is provided on the outer surface of the connecting wall 8 of the glass run 5 so that the elastically deformed part abuts the door sash 2 at the time of fully closing the door glass 3 and the plurality of convexes 13 are crushed while the plurality of concaves 14 are filled up. Such a structure is disclosed, for example, in the Japanese unexamined Utility Model Publication No. H04-84026.

The glass run 5 shown in FIG. 10 does not have the lip 15 formed on the inner surface on the inner-cabin side of the connecting wall 8.

The structures absorb impact at the time of fully closing the door glass 3 and reduce the generated impact sound to some extent, not sufficiently.

Especially, according to the glass run 5 shown in FIG. 10, when the end 3a of the door glass 3 abuts the inner surface on the inner-cabin side of the connecting wall 8, the convexes 13 provided on the outer surface of the connecting wall 8 elastically deform for the effect of stress from abutment. Such a structure enlarges a contact area of the connecting wall 8 with the door sash 2 so that the impact noise remains. In addition, there also remains a problem that formation of the convexes 13 and the concaves 14 on the outer surface of the connecting wall 8 complicates the structure.

Therefore, an object of the present invention is to provide the glass run having a simple structure, which is capable of sufficiently reducing the bumping sound at the time of the fully closing the door glass.

SUMMARY OF THE INVENTION

In order to achieve the above-mentioned object, a first aspect of the invention provides a glass run (5): which is fit on a door sash (2) or a door frame of an automobile; having a cross-section roughly U-shape comprising an outer-cabin side wall (6), an inner-cabin side wall (7) and a connecting wall (18) which connects the outer-cabin side wall (6) and the inner-cabin side wall (7) for guiding a door glass (3) lifting or lowering into a ditch part (4); and having an outer lip (9) and an inner lip (10) respectively formed on inner surfaces of both of the side walls (6, 7), which extend toward a connecting wall (18) side and are slidably brought into contact with said door glass (3), wherein: said connecting wall (18) has a part thereof swelled and curved toward an inner surface side thereof, which faces a position on the connecting wall (18) where said door glass (3) collides; said connecting wall (18) swelled and curved has a total of two projections (21, 22) formed on an outer surface thereof, which come into contact with said door sash (2) or said door frame and of which an interval (50) therebetween is not more than thickness (60) of said door glass (3); and a position surrounded by said two projections (21, 22), said connecting wall (18) and said door sash (2) or said door frame is formed into a space (40) having a cross-section roughly semicylindrical shape.

A second aspect of the invention provides a glass run (5) wherein: said connecting wall (18) has a lip (15) formed on an inner surface on an inner-cabin side thereof, which slants toward the outer-cabin side wall (6), makes an elastic contact with said door glass (3) and is pressed against said connecting wall (18).

A third aspect of the invention provides a glass run (5) wherein: said space (40) has a buffer member (30) provided therein.

A fourth aspect of the invention provides a glass run (5) wherein: said buffer member (30) is soft sponge (30).

A fifth aspect of the invention provides a glass run (5) wherein: before said door glass (3) abuts said connecting wall (18), said buffer member (30) provided in said space (40) of a mounted glass run is in a non-compressed state where said buffer member (30) is slightly brought into contact with said door sash (2) or said door frame and is not compressed.

Symbols in parentheses show constituents or items corresponding to Figures and DESCRIPTION OF PREFERRED EMBODIMENT.

According to the glass run of the present invention, the connecting wall of the glass run is subjected to impact generated by collision of the door glass at the time of fully closing the door glass so that the outer surface of the connecting wall bottoms on the door sash or comes to a stop on the door sash via a little aperture.

The outer surface of the connecting wall of the glass run has the two projections formed thereon, having the interval therebetween not more than thickness of the door glass. In addition, the position surrounded by the two projections, the connecting wall and the door sash is formed into the space of the cross-section roughly semicylindrical shape. Accordingly, stress from the impact at the time of bumping the door glass is dispersed to the two projections as well as the connecting wall.

Such a structure softens the impact at the time of the bumping the door glass, thereby reducing generation of the impact sound (bumping sound).

Specifically, in ordinary glass runs shown in FIG. 7, 8 or 10: where the interval between the projections on the outer surface of the connecting wall is wider than thickness of the door glass; the connecting wall does not have specific parts formed on the outer surface thereof, which correspond to the projections; or the outer surface of the connecting wall has the plurality of convexes and the plurality of concaves provided thereon, the connecting wall is subjected to the impact generated by bumping the door glass and makes an elastic contact with the door sash over a large area thereof, thereby generating a large impact sound (bumping sound). In the same way, the glass run of the present invention is subjected to the impact generated by bumping the door glass. But, according to the glass run of the present invention, the stress from the impact is transmitted to the two projections formed on the outer surface of the connecting wall as well as the connecting wall which makes the elastic contact with the door sash so that the stress is dispersed thereby reducing the generation of the impact sound (bumping sound).

The number of the projections formed on the outer surface of the connecting wall of the glass run of the present invention is two in total so that the structure is not especially complicated compared with the glass run shown in FIG. 10.

According to the glass run according to the second aspect of the present invention, the connecting wall has the lip formed on the inner surface on the inner-cabin side thereof, which slants toward the outer-cabin side wall so that the lip makes the elastic contact with the door glass and the lip is pressed against the connecting wall. Such a structure softens the impact generated by bumping the door glass compared with a glass run without the lip formed therein.

According to the glass run according to the third to fifth aspects of the present invention, the space has the buffer member provided therein, an example of which is the soft sponge. Accordingly, generation of the impact sound (bumping sound) is further reduced compared with a glass run without the buffer member provided therein.

Especially, according to the glass run according to the fifth aspects of the present invention, the buffer member is provided in the space of the mounted glass run in such a manner that before the door glass abuts the connecting wall, the buffer member is in the non-compressed state where the buffer member is slightly brought into contact with the door sash or the door frame and is not compressed. Accordingly, when the door glass abuts the connecting wall, the largest compression amount of the buffer member softens the impact.

DESCRIPTION OF PREFERRED EMBODIMENT

Referring to drawings, embodiments of the present invention will be described. When constituents or items correspond to those in prior arts, the same symbols are used.

Figure 1:
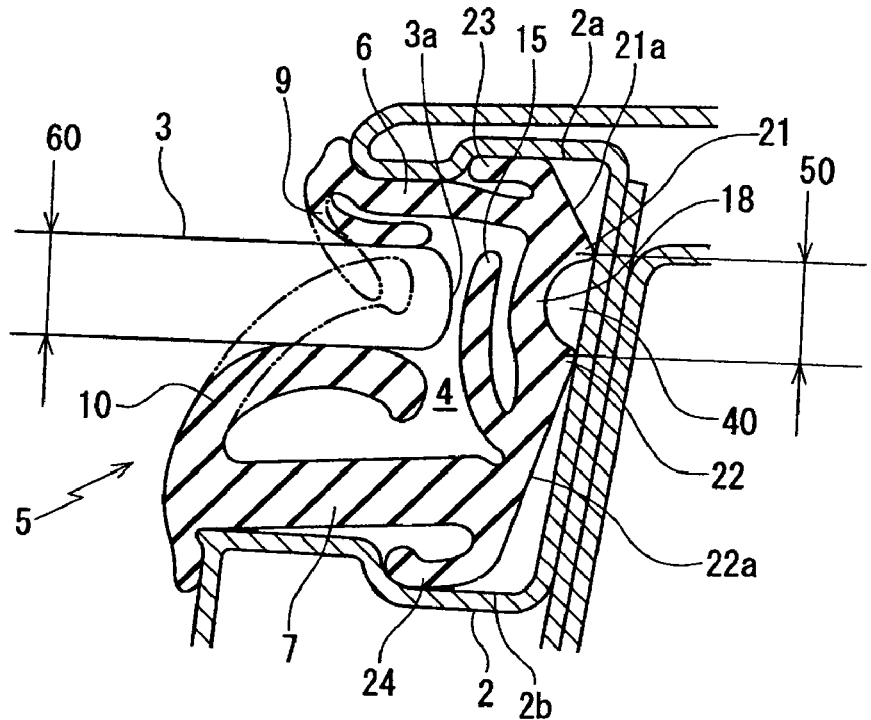
FIG. 1 is a I-I line enlarged cross section of FIG. 6, showing a glass run according to an embodiment of the present invention.
Figure 2:
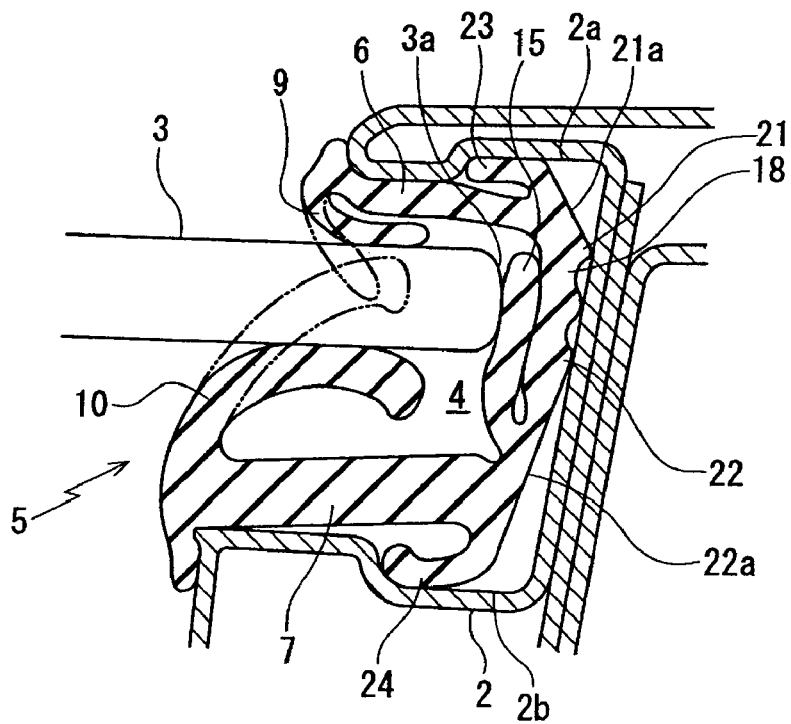
FIG. 2 is a cross section of the glass run of FIG. 1 at a time of fully closing a door glass.
Figure 6:
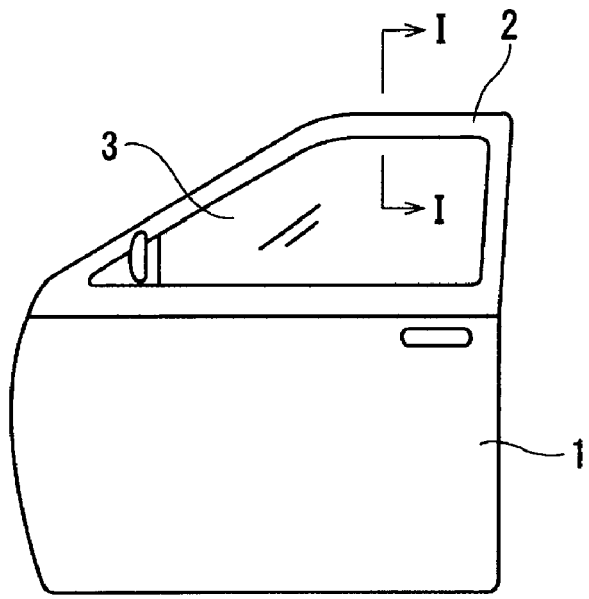
FIG. 6 is an outside lateral view of a door.

FIG. 1 is an enlarged cross section of a glass run according to an embodiment of the present invention and corresponds to a I-I line enlarged cross section of FIG. 6. FIG. 2 is a cross section of the glass run of FIG. 1 at a time of fully closing a door glass.

In the same manner as the prior arts, a glass run 5 according to an embodiment of the present invention is fit on a door sash 2 (or a door frame) of an automobile door 1 and guides a door glass 3 lifting or lowering into a ditch part 4.

The glass run 5 has a cross-section roughly U-shape comprising: two side walls, an outer-cabin side wall 6 and an inner-cabin side wall 7; and a connecting wall 18 which connects the outer-cabin side wall 6 and the inner-cabin side wall 7. The outer-cabin side wall 6 has an outer lip 9 formed on an inner-cabin side as an inner surface thereof, which extends toward a connecting wall 18 side and is slidably brought into contact with the door glass 3. In the same way, the inner-cabin side wall 7 has an inner lip 10 formed on an outer-cabin side as an inner surface thereof, which extends toward a connecting wall 18 side and is slidably brought into contact with a surface of a door glass 3.

The connecting wall 18 has a cross-section roughly tongue-shaped lip 15 formed on an inner surface on the inner-cabin side thereof, which slants toward the outer-cabin side wall 6.

A part of the connecting wall 18 is swelled and curved toward an inner side, which faces a position where the door glass 3 collides. The outer surface of the connecting wall 18 swelled and curved has a total of two projections 21, 22 which come into contact with the door sash 2.

Before the door glass 3 bumps the connecting wall 18 on the door sash 2 side, the two projections 21, 22 have cross-section roughly arc shapes and an interval 50 between the two projections 21, 22 is not more than thickness 60 of the door glass 3 (see FIG. 1). In the present embodiment, the interval 50 is the same as the thickness 60 (60=50). Positions for forming the two projections relative to the connecting wall 18 are not strictly limited but are preferably on extended lines of the thickness 60 of the guided door glass 3. When the interval 50 between the projections 21, 22 is less than the thickness 60 of the door glass 3, it is preferable that the positions for forming the two projections 21, 22 relative to the connecting wall 18 are on inner sides of the extended lines of the thickness 60 of the guided door glass 3. In addition, the projections are two in total: the projections 21, 22. Accordingly, when the interval 50 between the two projections 21, 22 is too short, an outer-cabin side of the connecting wall 18 compared with the projection 21 and an inner cabin side of the connecting wall 18 compared with the projection 22 may deform and abut the door sash 2. Therefore, the interval 50 is preferably at least not less than ½ of the thickness 60 of the door glass 3.

An outer-cabin side slope 21ba on the outer-cabin side of the projection 21 extends toward a side surface on an outer-cabin side of the door sash 2 and has an anchoring lip 23 provided on an end thereof, anchored by an outer-cabin side concave part 2a of the door sash 2. An inner-cabin side slope 22a on the inner-cabin side of the projection 22 extends toward a side surface on an inner-cabin side of the door sash 2 and has an anchoring lip 24 provided on an end thereof, anchored by an inner-cabin side concave part 2b of the door sash 2. The connecting wall 18 has a roughly M shape.

A position surrounded by the two projections 21, 22, the connecting wall 18 and the door sash 2 is formed into a space 40 having a cross-section roughly semicylindrical shape (cross-section roughly semicircular shape). In the present embodiment, depth of the space 40 relative to the width of space 40 (interval 50 between the projections 21, 22) is roughly ½.

The space 40 is formed on an opposite surface side of the position beyond the connecting wall 18, where a center line on an end 3a of the door glass 3 collides, which halves the thickness 60 of the door glass 3. More specifically, the space 40 is formed on a position on the outer surface side of the connecting wall 18, opposing to a position where said center line collides.

Examples of materials for use as the glass run 5, effective in reducing the bumping sound of the door glass 3 include EPDM rubber, an olefinic thermoplastic elastomer, a styrene-based thermoplastic elastomer and an elastomer of mixture of at least two of these materials.

According to the above-structured glass run 5 of the embodiment of the present invention, the lip 15 and the connecting wall 18 against which the lip 15 is pressed are, as shown in FIG. 2, subjected to impact generated by collision of the door glass 3 at the time of fully closing the door glass 3 so that center of the outer surface of the connecting wall 18 bottoms on the door sash 2 or comes to a stop on the door sash 2 via a little aperture.

The connecting wall 18 of the glass run 5 has the two projections 21, 22 formed on the outer surface thereof, which have the same interval therebetween as the thickness 60 of the door glass 3 and come into contact with the door sash 2. In addition, the position surrounded by the two projections 21, 22, the connecting wall 18 and the door sash 2 is formed into the space 40 having the cross-section roughly semicylindrical shape. Accordingly, the stress from the impact generated by bumping the door glass 3 is dispersed to the two projections 21, 22 as well as the lip 15 and the connecting wall 18.

Such a structure softens the impact at the time of bumping the door glass 3, thereby reducing generation of the impact sound (bumping sound).

Figure 7:
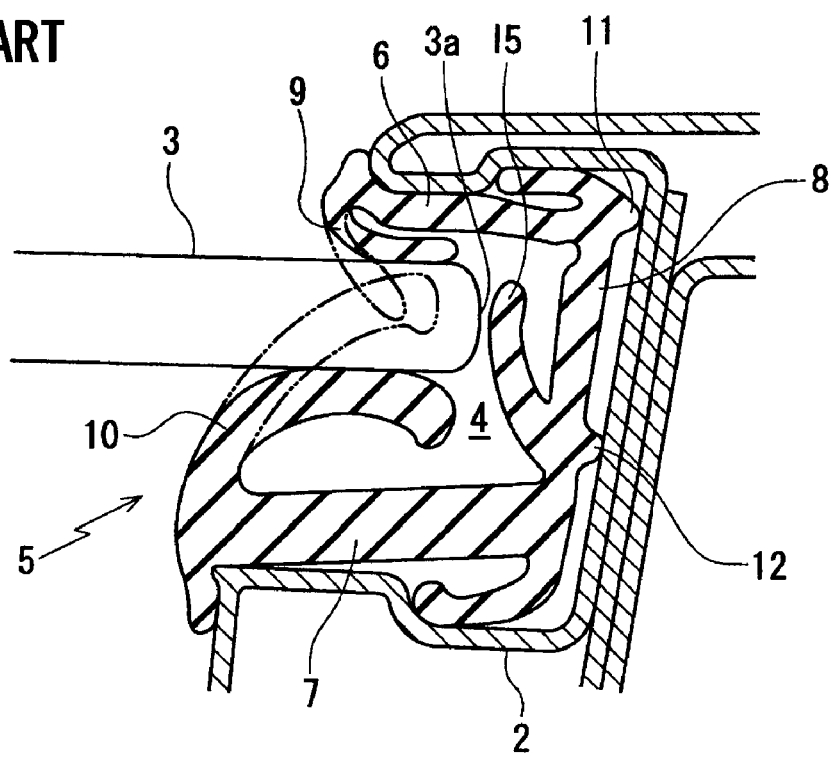
FIG. 7 is a I-I line enlarged cross section of FIG. 6, showing a glass run according to a prior art.
Figure 8:
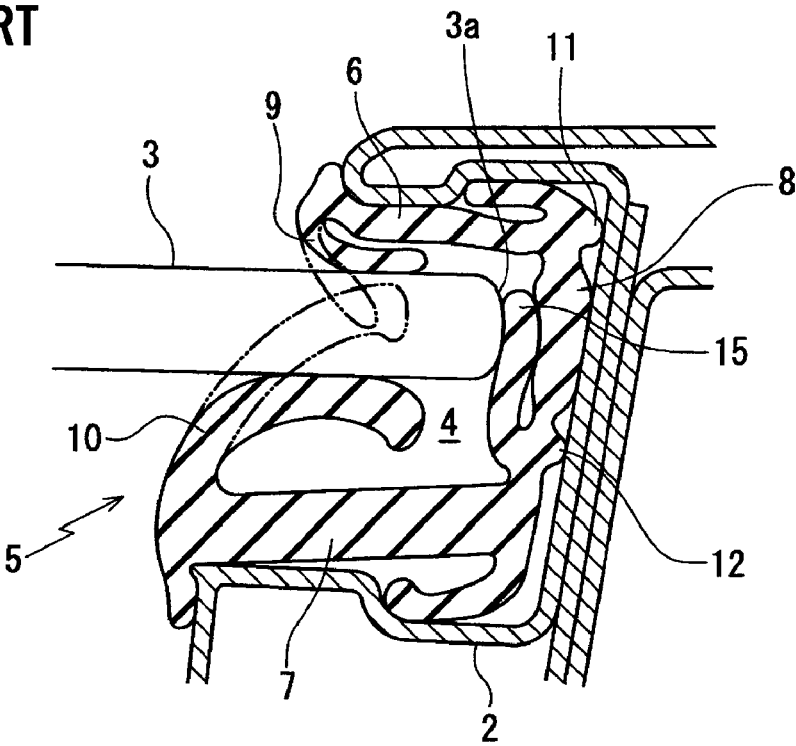
FIG. 8 is a cross section of the glass run of FIG. 7 at a time of fully closing a door glass.
Figure 9:
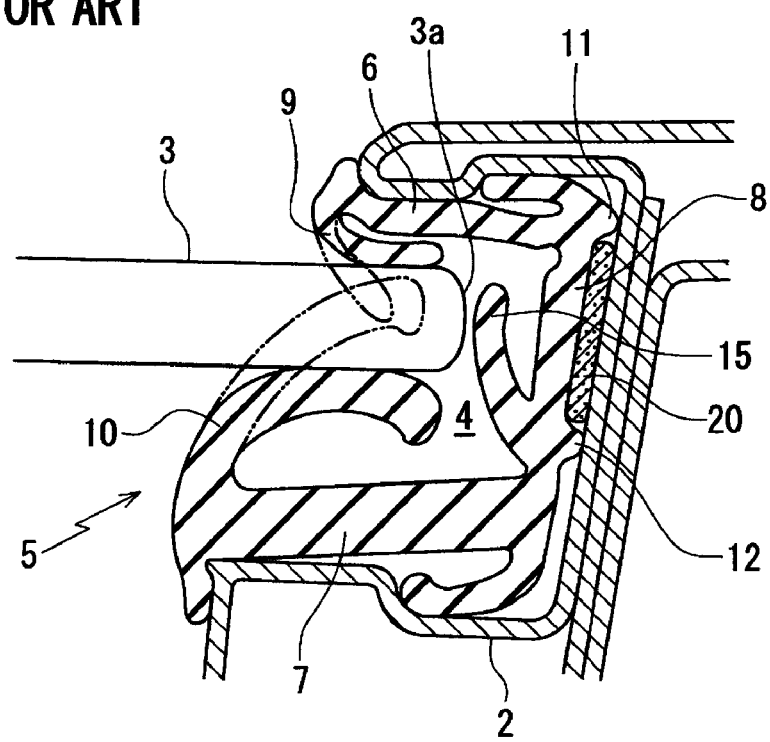
FIG. 9 is a I-I line enlarged cross section of FIG. 6, showing a glass run according to another prior art.
Figure 10:
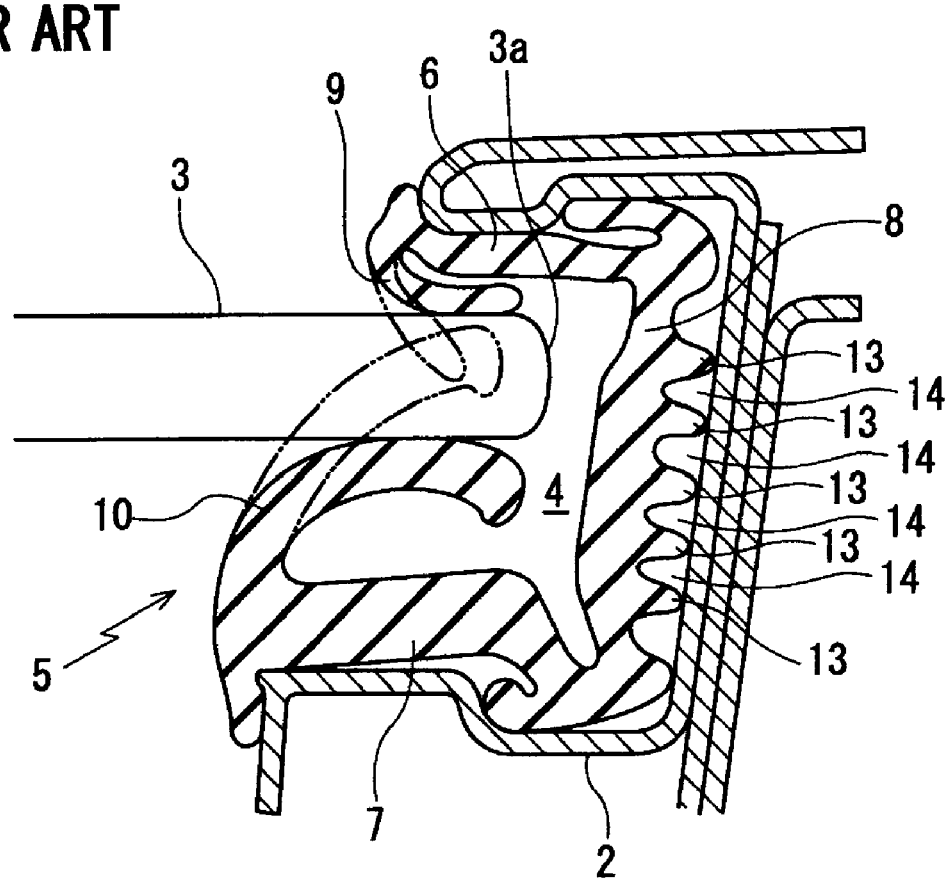
FIG. 10 is a I-I line enlarged cross section of FIG. 6, showing a glass run according to still another prior art.

Specifically, in ordinary glass runs shown in FIG. 7, 8 or 10, where: an interval between the two projections 11, 12 on the outer surface of the connecting wall 8 is wider than thickness of the door glass 3; the connecting wall 8 does not have specific parts formed on the outer surface thereof, which correspond to the projections 11, 12; or the connecting wall has a plurality of convexes and a plurality of concaves provided on the outer surface thereof, the connecting wall 8 is subjected to the impact generated by collision of the door glass 3 via the lip 15 (or the connecting wall 8 is directly subjected to the impact where the lip 15 is not provided) and makes an elastic contact with the door sash 2 over a large area thereof, thereby generating a large impact sound (bumping sound). On the other hand, according to the glass run 5 of the present embodiment, the connecting wall 18 is subjected to the impact generated by bumping the door glass 3 via the lip 15 but the stress from the impact is transmitted to the two projections 21, 22, which are formed on the outer surface of the connecting wall 18 and have the same interval 50 therebetween as the thickness 60 of the door glass 3 as well as the connecting wall 18 which makes the elastic contact with the door sash 2 so that the stress is dispersed thereby reducing the generation of the impact sound (bumping sound).

The number of the projections 21, 22, provided on the outer surface of the connecting wall 18 of the glass run 5 of the present embodiment is two in total so that the structure is not especially complicated compared with the glass run shown in FIG. 10.

In the present embodiment, the interval 50 between the two projections 21, 22, which is the same as the thickness 60 of the door glass 3 and formation of the space 40 disperse the stress from the impact generated by bumping the door glass 3 to the two projections 21, 22. But the interval 50 between the two projections 21, 22, which is shorter than the thickness 60 of the door glass 3 and the formation of the space 40 also disperse the stress from the impact generated by bumping the door glass 3 to the two projections 21, 22, thereby sufficiently reducing the impact sound (bumping sound).

Figure 3:
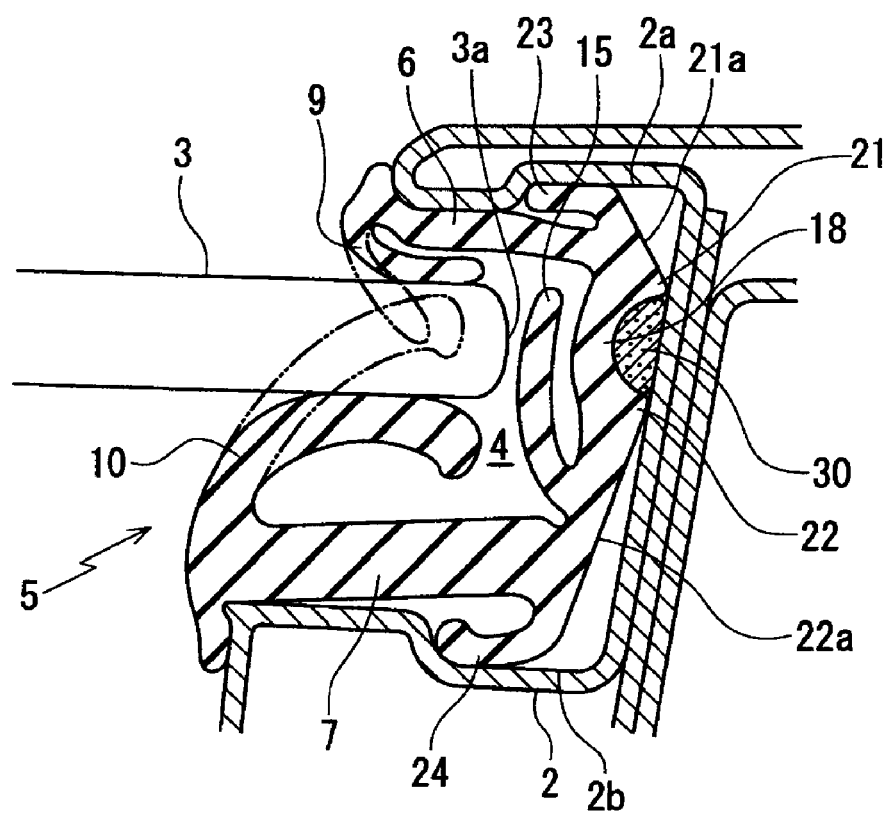
FIG. 3 is a I-I line enlarged cross section of FIG. 6, showing a glass run according to another embodiment of the present invention.

In the present embodiment, the space 40 thus formed has nothing provided therein. But the space 40 may have a buffer member provided therein as shown in FIG. 3. Examples of the buffer member include a soft sponge 30 having a specific gravity of, for example, 0.1 to 0.7 and a vibration-proof sponge.

The above-mentioned examples of the buffer member have smaller specific gravity than the connecting wall 18 of the glass run 5. Use of the buffer member further reduces the generation of the impact sound (bumping sound) compared with the glass run 5 which does not have the buffer member provided therein.

In a state before the door glass 3 abuts the connecting wall 18, that is a sate that the glass run 5 is mounted on the door sash 2, the buffer member 30 may be provided in the space 40 in a little compressed state. But according to an embodiment shown in FIG. 3, the buffer member 30 is in a non-compressed state where the buffer member 30 is slightly brought into contact with the door sash 2 and is not compressed.

According to the structure shown in FIG. 3, when the door glass 3 abuts the connecting wall 18, the largest compression amount of the buffer member 30 softens the impact.

Figure 4:
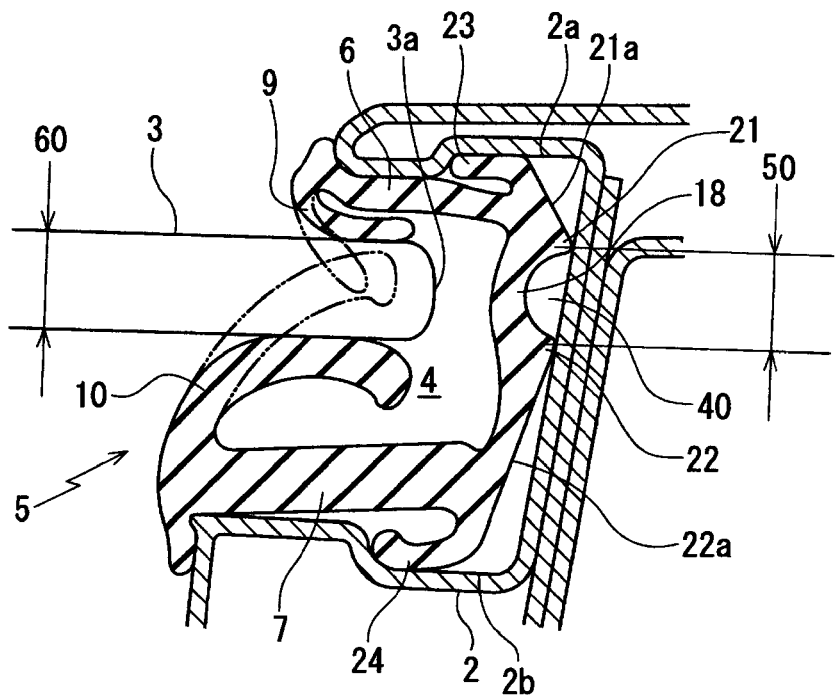
FIG. 4 is a I-I line enlarged cross section of FIG. 6, showing a glass run according to still another embodiment of the present invention.
Figure 5:
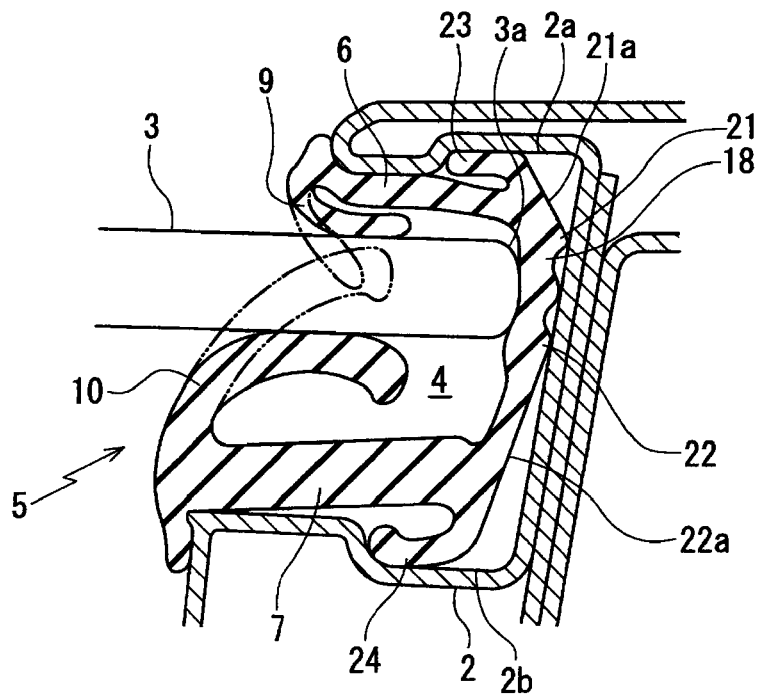
FIG. 5 is a cross section of the glass run of FIG. 4 at a time of fully closing a door glass.

In addition, the connecting wall 18 of the glass run 5 of the present embodiment has a lip 15 extended therefrom so that the lip 15 directly abuts the door glass 3 at the time of bumping the door glass 3. But the formation of the lip 15 may be omitted as shown in FIGS. 4 and 5.

We claim:
1. A glass run which is fittable on a door sash or a door frame of an automobile, the glass run having a substantially U-shape in cross-section, the glass run comprising:
   an outer-cabin side wall;
   an inner-cabin side wall;
   a connecting wall which connects the outer-cabin side wall and the inner-cabin side wall for guiding a door glass lifting or lowering into a ditch part; and
   an outer lip and an inner lip respectively formed on inner surfaces of the outer-cabin and the inner-cabin side walls, the outer lip and the inner lip extending toward a connecting wall side and being slidably brought into contact with said door glass;

wherein:
 a part of said connecting wall is swelled and curved toward an inner side thereof, the part facing a position on the connecting wall where said door glass collides;
 said part of said connecting wall swelled and curved has a total of two projections formed on an outer surface thereof before said door glass collides with said connecting wall, wherein said two projections come into contact with said door sash or said door frame and an interval between said two projections is not more than a thickness of said door glass before said door glass collides with said connecting wall; and
 a position surrounded by said two projections, said connecting wall, and said door sash or said door frame is formed into a space having a substantially semicylindrical shape in cross-section.

2. The glass run as claimed in claim 1, wherein said connecting wall has a lip formed on an inner surface on an inner-cabin side thereof, wherein the lip slants toward said outer-cabin side wall, makes elastic contact with said door glass, and is pressed against said connecting wall.

3. The glass run as claimed in claim 1, wherein said space has a buffer member provided therein.

4. The glass run as claimed in claim 3, wherein said buffer member comprises a soft sponge.

5. The glass run as claimed in claim 4, wherein before said door glass abuts said connecting wall, said buffer member provided in said space is in a non-compressed state in which said buffer member is slightly brought into contact with said door sash or said door frame and is not compressed.

6. The glass run as claimed in claim 2, wherein said space has a buffer member provided therein.

7. The glass run as claimed in claim 6, wherein said buffer member comprises a soft sponge.

8. The glass run as claimed in claim 7, wherein before said door glass abuts said connecting wall, said buffer member provided in said space is in a non-compressed state in which said buffer member is slightly brought into contact with said door sash or said door frame and is not compressed.

* * * * *